United States Patent [19]
Faget et al.

[11] 3,929,306
[45] Dec. 30, 1975

[54] SPACE VEHICLE SYSTEM

[75] Inventors: Maxime A. Faget, Dickinson;
William W. Petynia, Seabrook;
Willard M. Taub, Houston, all of Tex.

[73] Assignee: The United States of America as represented by the United States National Aeronautics and Space Administration Office of General Counsel-Code GP, Washington, D.C.

[22] Filed: Mar. 5, 1974

[21] Appl. No.: 448,323

[52] U.S. Cl. ............................. 244/162; 244/172
[51] Int. Cl.² ................................... B64G 1/00
[58] Field of Search .......... 244/162, 158, 160, 172, 244/54

[56] References Cited
UNITED STATES PATENTS
| | | | |
|---|---|---|---|
| 3,295,790 | 1/1967 | Webb | 244/160 |
| 3,369,771 | 2/1968 | Walley et al. | 244/162 |
| 3,702,688 | 11/1972 | Faget | 244/162 |

*Primary Examiner*—Trygve M. Blix
*Assistant Examiner*—Barry L. Kelmachter
*Attorney, Agent, or Firm*—Russell E. Schlorff; John R. Manning; Marvin F. Matthews

[57] ABSTRACT

A space vehicle system consisting of an orbiter vehicle having an expendable propellant tank attached to the underside surface thereof. An engine module is retractably supported from the aft end of the orbiter vehicle and extends therebeneath so as to be in axial alignment with the propellant tank when in operation. After the engine has consumed the propellant, it is retracted into the orbiter vehicle and the tank is jettisoned therefrom thus reducing orbiter weight and improving flight characteristics.

18 Claims, 8 Drawing Figures

SPACE VEHICLE SYSTEM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

The present invention relates to aerospace vehicles. More particularly the invention pertains to rocket powered vehicles which are intended for use in outer space and which are adapted to be maneuverably returned to a predetermined landing site on the Earth, while carrying a substantial payload.

2. Description of the Prior Art

Initially, man's first encounter with the exploration of outer space was accomplished through the use of rocket propelled systems essentially consisting of a spacecraft mounted on the nose of a ballistic missile. The controlled flight path of the spacecraft was limited substantially to the ascent trajectory with the sensory function of control being performed by pre-calculated and pre-programmed, automatic inertial guidance systems. These spacecraft and vehicles, such as the type disclosed in U.S. Pat. No. 3,093,346 to M. A. Faget et al, were proven most satisfactory in the course of man's early ventures into space. Later excursions into space were accomplished through the design and utilization of similar but larger spacecraft which were adapted to transport a plurality of men. Such multi-man spacecraft in due course were launched by Saturn booster rockets, and sequential portions were separated therefrom once in orbit so as to accomplish navigation to the lunar surface for landing, exploration, and ultimate return to Earth.

The objectives of man now have turned from lunar exploration and are directed to more extended and broader accomplishments which require space vehicle systems capable of maneuvering to and from large manned satellites or interplanetary vehicles. It is contemplated that these space missions will engage in the movement of substantial payloads consisting of men and scientific equipment from one space location to another and to Earth. Since research, development and actual utilization of space vehicle propulsion systems are restricted by practical payload limits and costs associated therewith, it is understood that multiple freight and passenger trips will be necessary for individual space vehicle systems. It has therefore become apparent that the practice heretofore of utilizing single mission rocket propelled systems is prohibitively expensive because of the need to provide an entirely new spacecraft vehicle and propulsion system with every launch. Thus, designers have endeavored to reduce the cost per pound of payload by increasing the operational flexibility of the individual space vehicle system and have pursued a vehicle configuration capable of navigation both in outer space and in the Earth's atmosphere. More importantly, designers have endeavored to conceive a space vehicle system that is reusable for subsequent launches, that is capable of transporting large payloads to orbital altitudes, that can nondestructively survive re-entry stresses, and which is possessed of navigation characteristics that enable it to land at alternative selected locations, all with a minimum of maintenance, down-time antecedent to re-deployment, and fueling time.

A decade of research for an efficient reuseable space vehicle transportation system to carry men and equipment between the earth and earth orbit initially defined a system consisting of two piloted recoverable vehicles in a mated configuration. A larger first booster vehicle propels the mated pair to an altitude of about 65 km where the second vehicle known as the orbiter is released. Following separation, the booster vehicle flies back to a landing strip, and the orbiter continues under its own rocket power to earth orbit. Such a space vehicle transportation system is fully described in M. A. Faget, U.S. Pat. No. 3,702,688, entitled "Space Shuttle Vehicle and System." It was later determined that an expendable rocket could be utilized as the booster.

The Faget Shuttle patent discloses an orbiter with liquid-oxygen and large liquid-hydrogen tanks within the fuselage main structure to supply the rear mounted rocket engines. Also, smaller JP fuel tanks were placed internally of the fuselage to supply the air-breathing engines which operate after re-entry and provide aerodynamic maneuvering power. H. E. Thomason, U.S. patent application, Ser. No. 198,380 now abandoned entiled "Reuseable Space Transportation System," describes an orbiter configuration with expendable drop tanks for the liquid hydrogen which are separated after the orbiter is inserted into transfer orbit.

It has been discovered that not only can the liquid hydrogen tank be incorporated in an expendable external drop tank but that the liquid oxygen tank can also be so incorporated. By doing so all rocket propellant tanks are removed from the orbiter. Therefore, after propellant use, the tanks are jettisoned and the orbiter does not carry a potential "bomb" with it during the remainder of its mission. The inclusion of the oxygen in the expendable tank substantially reduces the size of the orbiter. Also, manufacturing complexities of the orbiter are reduced and development and test of the orbiter and the external tanks can proceed in parallel.

Heretofore, design criteria which dictated that the space vehicle have a propellant tank which could be separated and expended from the vehicle subsequent to the utilization of the propellant was characterized by an aft mounted rocket engine fixedly attached to the main structure of the space vehicle fuselage. After the propellant (generally liquid oxygen and hydrogen) had been consumed, the tank was jettisoned so as to reduce the vehicle weight and thereby increase the range and maneuverability. Although there was thus obtained a reusable spacecraft vehicle, numerous disadvantages characterized this basic design. For example, the rocket engines and propellant tanks would generally reside along distinct and separate longitudinal center lines, thus requiring more substantial structural design of the space vehicle itself so as to withstand the stress imparted to it by the thrust of the rocket engine mounted at the aft end thereof. Also, extensive propellant lines were necessary in order to transport the liquid oxygen from the front of the expendable tank back to the engine. This is undesirable because high density liquid oxygen propellant lines are known to be susceptible to integrity loss caused by pressure fluctuations. Also, such a design required provision for interface connections of the propellant lines between the space vehicle and the propellant tank. These interface connections must of course be separable so that the tank may be expended from the vehicle when the oxygen and hydrogen are exhausted. Each such interface poses potential leakage problems, not only during actual launch and burning time but also upon separation, and even during static firing and flight verification tests performed on earth prior to launch.

BRIEF SUMMARY OF THE INVENTION

The present invention describes a space vehicle system essentially comprising an orbiter, a separable propellant tank and an engine module. The engine module is retractably supported from the aft end of the orbiter but is disposed therebeneath so as to be in axial alignment with the propellant tank when in operation. After the propellant in the tank has been used, the engine module is retracted into the orbiter and the tank is jettisoned, thereby facilitating navigational and operational objectives of the orbiter thereafter.

Although the above design is characterized by relative simplicity, significant advantages over prior designs are achieved. Of obvious benefit is the fact that the engine module may be coupled to the propellant tank along a common axial centerline, thereby avoiding the direct transmission of thrust forces through the orbiter vehicle. Additionally, pivoting angles for the engine module are reduced because as the propellant in the tank is consumed engine module angles must be changed and this change is less when the module is axially aligned with the tank itself. Also, since the engine module is axially aligned with the tank, the heavier propellant component, that is oxygen, may be located in the rear portion of the tank, rather than in the front as is more commonly the case, this because the thrust forces from the engine module may be transmitted directly to the structural portion of the tank containing the heaviest propellant component, thereby enabling the lighter structural design in the front section of the tank where the lighter propellant component of hydrogen is contained.

Relocation of the oxygen to the aft portion of the propellant tank provides for other advantageous results. For example, significant shortening of high density liquid oxygen propellant lines is achieved. Propellant line interfaces between the propellant tank and the orbiter vehicle itself are eliminated. Both of these advantages impart improvements to the reliability of the system.

A further advantage which accrues to the retractable engine module design which eliminates propellant line-orbiter interfaces, is the ability to more confidently conduct engine module static firing development and flight verification tests independently of the orbiter airframe.

Yet another advantage accrues from disposition of the engine module adjacent to the propellant tank during operation and provision for a mechanism to retract the module into the space vehicle after the propellant has been exhausted, thereby achieving reuse of the module and substantial cost reductions.

These and numerous other features and advantages of the invention will become apparent upon a reading of the following detailed description, claims and drawings wherein like numerals denote like parts in the several views and wherein:

DESCRIPTION OF A PRESENTLY PREFERRED EMBODIMENT

Figure 1:
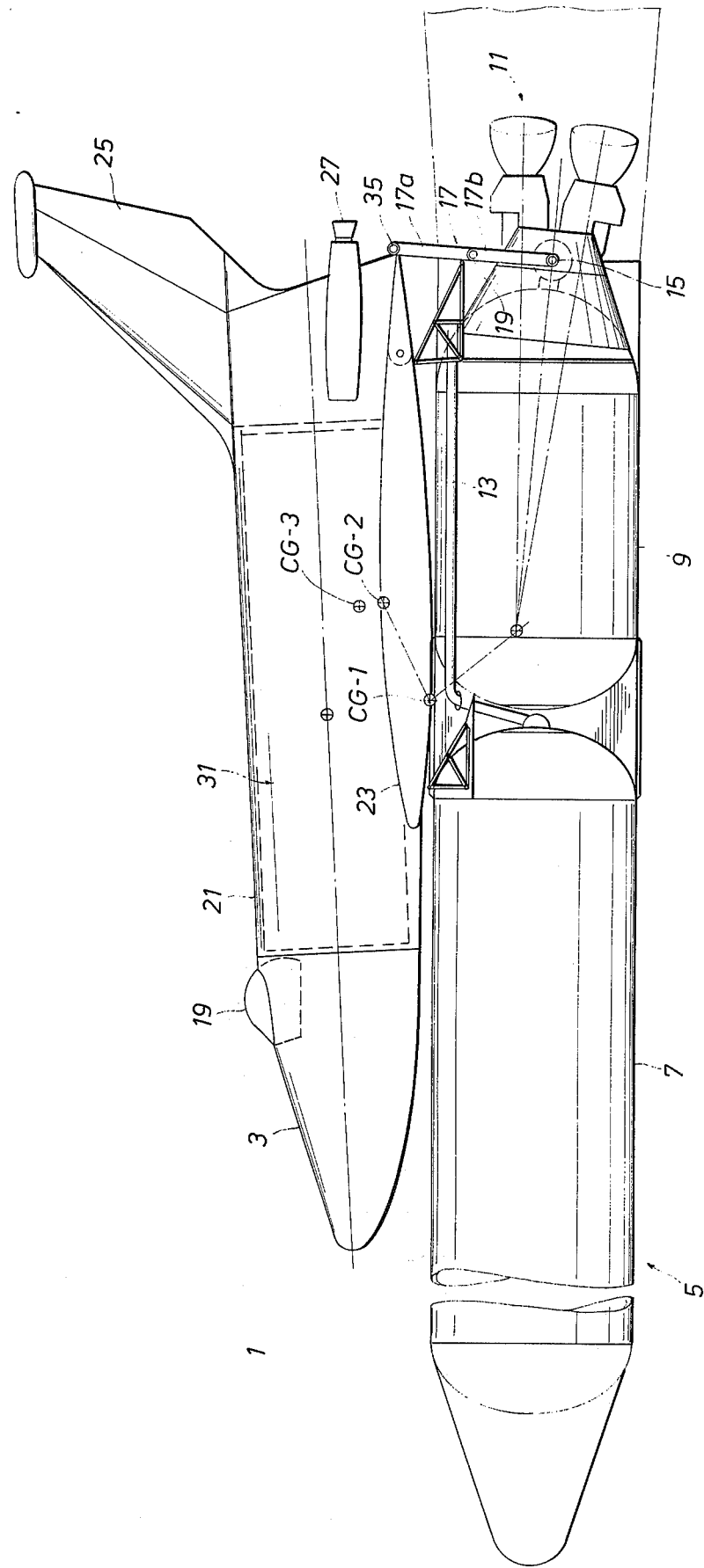
FIG. 1 is a general arrangement of the space vehicle system essentially comprising the orbiter vehicle, the expendable propellant tank suspended therebeneath and the retractable engine module.

Referring now to FIG. 1, there is shown a general arrangement of the space vehicle system 1 consisting of the orbiter vehicle 3 and an expandable drop tank 5. The drop tank is characterized by respective fore 7 and aft 9 tank sections. The expendable tank 5 and associated engine module (described hereafter) comprises the propulsion means for the orbiter 3 and generally carries the component propellants of liquid hydrogen ($LH_2$) and liquid oxygen ($LO_2$) respectively in the fore aft tank sections 7,9. Structurally supported from the aft end of orbiter 3 by the retraction linkage means 17 is the engine module 11. As shown for example in FIG. 2, the engine module 11 consists of a multi-engine array that is appropriately coupled to the hydrogen and liquid oxygen sections 7,9 of tank 5 by piping 13 through which propellant flow is properly regulated by pumps and necessary metering equipment (not shown).

The orbiter vehicle 3 is characterized by a forward crew compartment 19, a central fuselage 21, a delta wing configuration 23 an empennage structure 25. Appropriate launch abort motors 27 are carried at the aft end of the fuselage. Orbiter 3 is further characterized by a substantial payload area 31 extending from the aft end forward toward the crew compartment 19. Payload area 31 is, in accordance with the invention, utilized at least in part, for the storage of engine module 11 after the same is retracted from its operative position adjacent the aft end of expendable propellant tank 5. Access to the engine storage area is accomplished through opening 33 in the rear of the fuselage (see FIG. 2) or through a similar opening in the top of the fuselage adjacent to empennage 25 (see modified configuration FIG. 5b).

Figure 2:
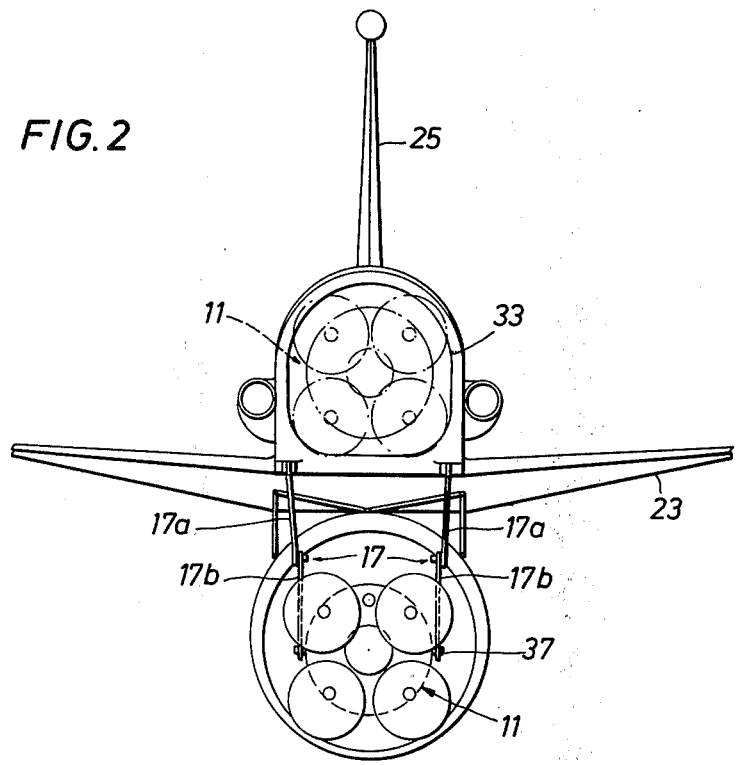
FIG. 2 is a rear view of the space vehicle system of FIG. 1.

Structurally appended to the aft end of fuselage 21 is the support and retraction linkage 17. The linkage may take numerous forms but is shown for exemplary purposes in the drawings as a pair of articulated links, as best shown in FIG. 2. Each of the articulated links includes a first link member 17a that is supported from the aft end of fuselage 21 adjacent to opening 33. A second link member 17b, hingedly connected to the end of the first link member, is connected at its other end to the engine module 11 so as to thereby support the module from the fuselage. It will thus be visualized, and as explained hereafter with reference to the drawings, that the engine module 11 is movably mounted and may be retracted from its deployed operative position adjacent the expendable tank to its stowed position within the fuselage by reason of the arcuate movements produced by the aforementioned link members.

Figure 3:
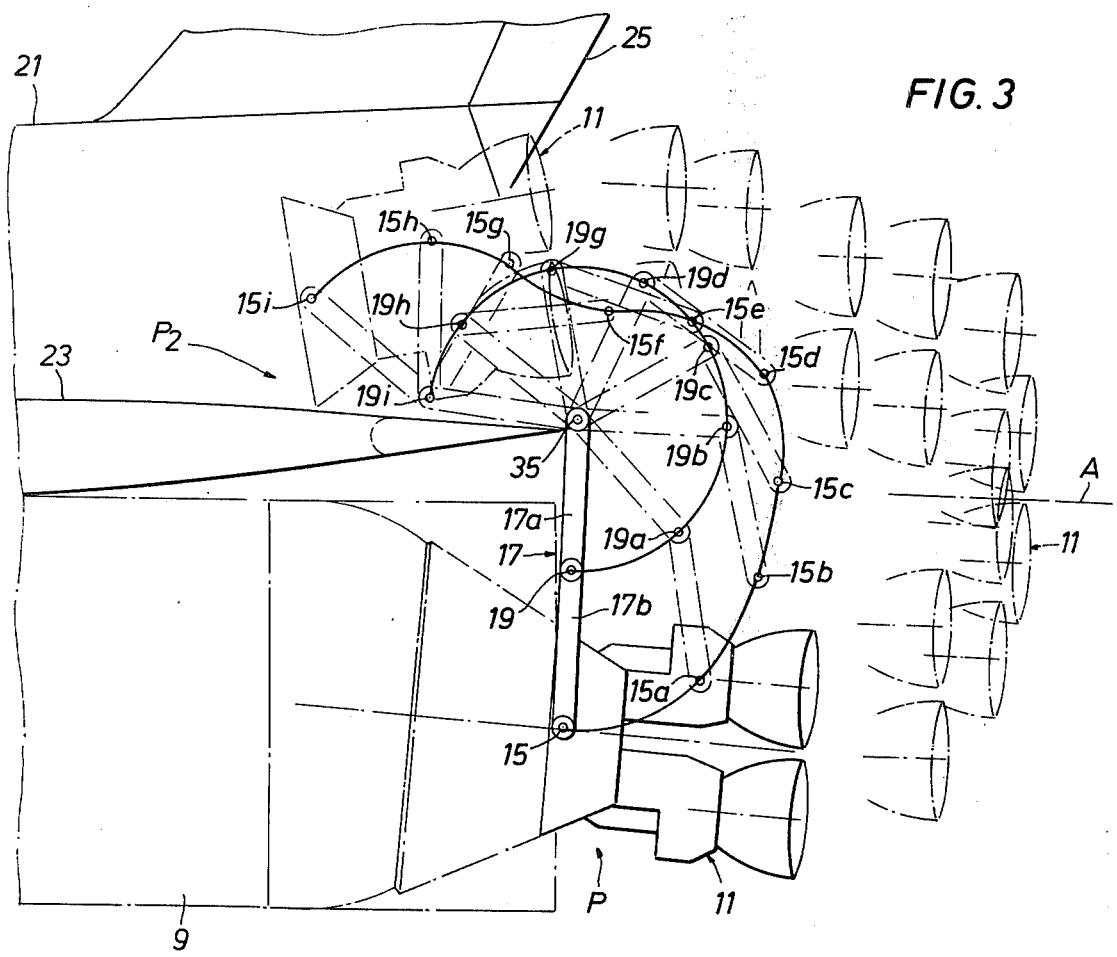
FIG. 3 is an illustrative diagram showing a sequence of pivot positions of the retraction linkage for the engine module of FIG. 1.

FIGS. 3 through 5 exemplify various different methods for accomplishing the aforementioned retraction. In FIG. 3 there is shown in detail the relative movements of the first and second link members 17a, b as the engine module 11 traverses an arcuate path while maintaining its longitudinal axis "A" in a substantially horizontal plane. In FIGS. 4 and 5 the module 11 similarly moves from its operative position adjacent to propellant tank 5 into fuselage 21 of the orbiter. Here, however, the axis "A" of the module 11 pivots from its horizontal operational position to a substantially vertical orientation prior to stowage in fuselage 21. In FIG. 4 the module enters through the rear of the fuselage while in FIG. 5 it enters through an opening in the top of the fuselage, this alternative being available when a dual vertical stabilizer design permits entry of the module in such a manner.

With reference now to FIG. 3 there is shown the isolated motion sequence wherein the relative movement of each of the first and second link members of the support and retraction linkage 17 are shown. Likewise, the respective paths of the pivot points of each link member is illustrated so that sequential positioning of the engine module is clearly illustrated. Module 11 is supported on the terminal end of second link members 17b by module pivot 15 thereby enabling relative motion of the module with respect to the longitudinal axis of system 1. Movement of module pivot 15 and link pivot 19 about the principal pivot 35 substantially determines the path of module 11 during its movement. This path is readily traced by brief examination of FIG. 3 wherein it is seen that module pivot 15 moves at a slower rate in its arcuate path than does link pivot 19. For example, with respect to the principal pivot 35 it is seen that module pivot 15 has moved less than a quadrant at its third position 15c whereas link pivot has moved more than a quadrant at its third position 19c. As the two pivots 15 and 19 move about principal pivot 35, their respective rate of movement is so programmed as to achieve the path of module movement illustrated, this in order to accomplish retraction of the module 11 through the aft opening 33 of the orbiter. Although the drawing illustrates a specific number of positions (15a through 15i and 19a through 19i) for the link members, it is readily understood that an infinite number of positions exist in the retraction procedure shown.

Figure 4A:
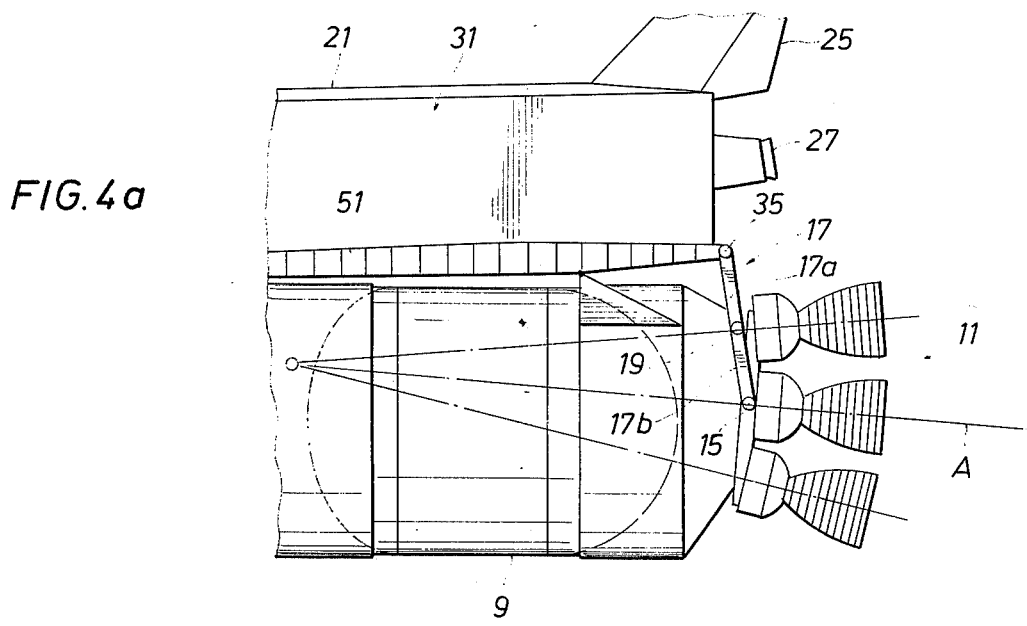
FIGS. 4a, b and c illustrate respectively, in section views, an alternative retraction linkage system showing the engine module
  first in operative relation to the expendable tank;
  second, in retracted position in the orbiter, as viewed from above,
  third, in retracted position in the orbiter as viewed from the side.
Figure 4B:
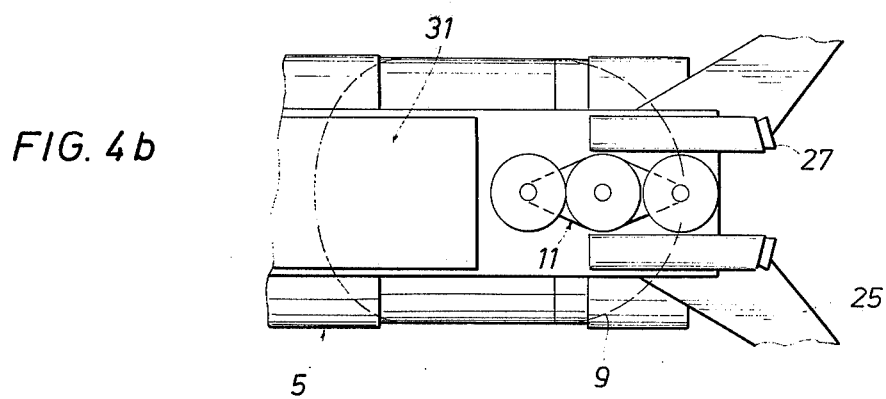
Figure 4C:
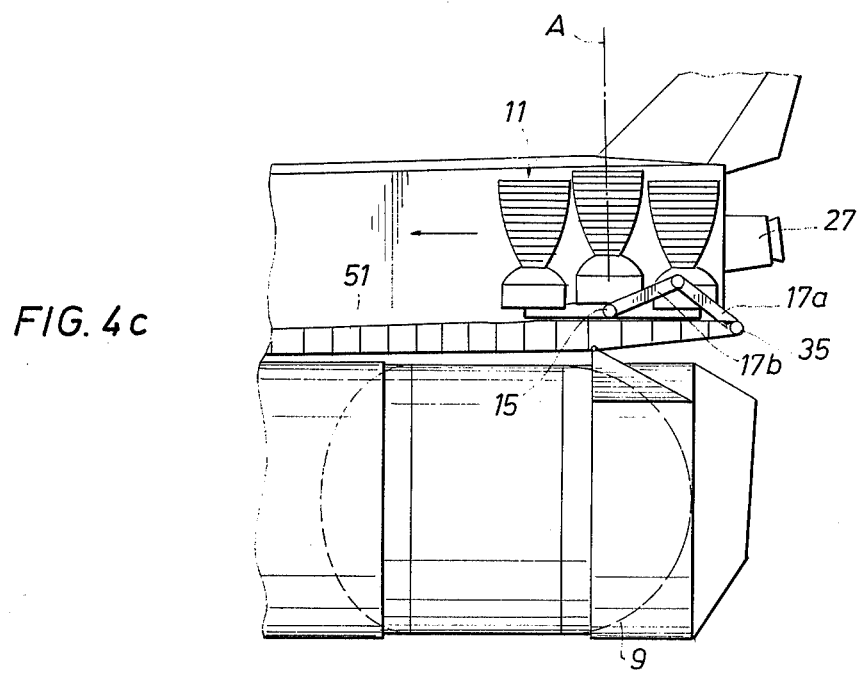

With reference now to FIGS. 4a through c there is illustrated another retraction procedure. Here, a module 11 contains three vertically aligned engines which are adapted to be retracted into the orbiter. The engines are structurally connected in fixed relation to one another but are pivotally connected to the support and retraction linkage 17 at pivoted connection 15. In a manner similar to the structure of FIG. 3 the link pivot 19 is adapted to move about principal pivot 35 in order to accomplish retraction and concomitant rotation of the module 11 during the course thereof. The path of retraction here is accomplished by the movement of the first and second link members 17a, 17b about their respective pivots 35 and 19 while the engine module 11 pivots about its pivot connection 15. Continued movement of the articulated linkage results in the vertically oriented positioning of the module in the fuselage, see FIGS. 4b and c.

Figure 5A:
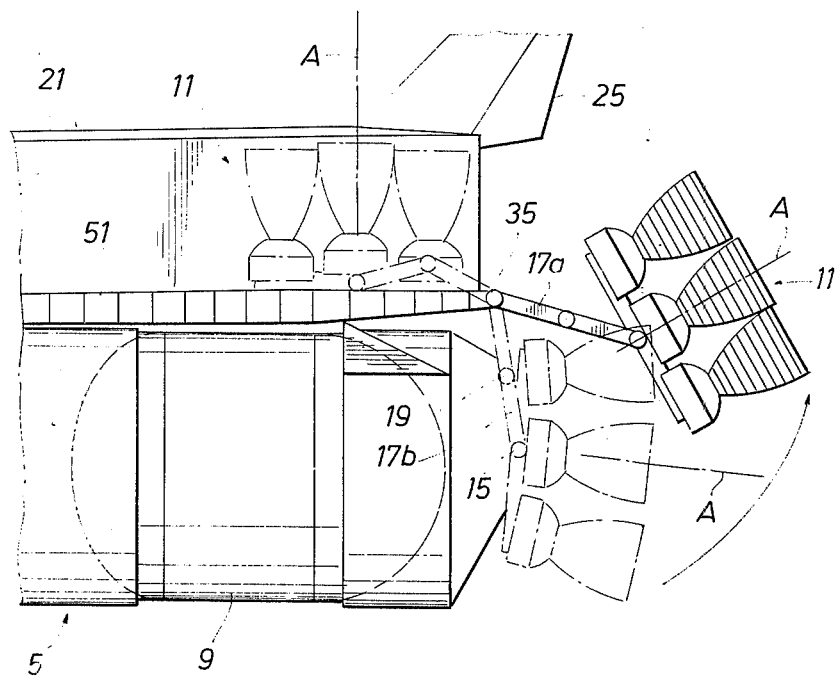
FIGS. 5a and b show other alternative engine module retraction systems wherein the views respectively illustrate
  first the engine module retraction linkage hingedly attached to the orbiter fuselage at a lower aft position,
  second, the engine module retraction linkage hingedly attached to the orbiter fuselage at an upper aft position.
Figure 5B:
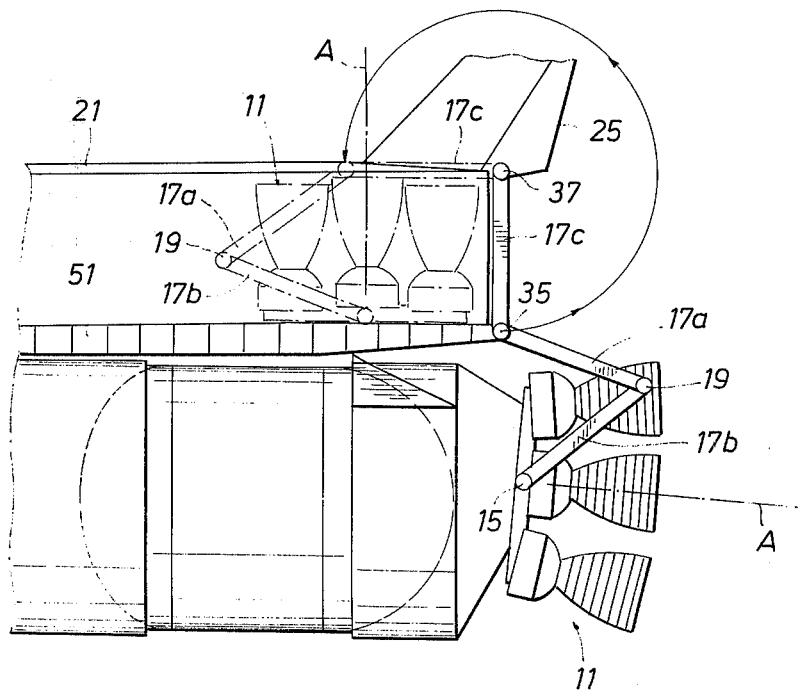

With reference to FIGS. 5a and 5b other forms of engine protraction methods are illustrated. Here there is again shown a vertically aligned three-engine array. The engine module 11 in FIG. 5a is mounted, as earlier explained with reference to FIG. 4, to the aft end of fuselage 21 by a support and retraction linkage comprising the first and second link members 17a, 17b, each adapted respectively to rotate about pivots 35 and 19. Here, however, the module 11 traverses a rather high arcuate path as members 17a, 17b maintain a substantially aligned relation to one another as they move about pivot 35 through the vertical position. As a result module 11 enters fuselage 21 from the top thereof, at which time member 17b initiates movement about its pivot 19 and the module initiates movement toward a horizontal position about pivot 15. Upon completion of the sequence the module comes to rest within fuselage 21 on positioning means 51 as shown in the drawing.

A similar mechanism for accomplishing rotation and retraction of the module into the fuselage, from above, is shown in FIG. 5b. Here link members 17a, 17b may be somewhat more elongate than as shown in FIG. 5a. Here the first link member 17a is coupled to upper link member 17c which is adapted to rotate about upper pivot 37. Upon initiation of the retraction procedure link members 17a and 17b may simultaneously begin their pivoting motion as upper link member 17c initiates its motion about upper pivot 37 so as to lift and rotate the module upwardly and around empennage 25 and downwardly into the fuselage, all as shown in the drawing. All three of the link members 17a, b, c are thus adapted to selectively move at varying rates about upper pivot 37 in order to ultimately dispose the module 11 upon the positioning means 51 with the upper and lower link members 17a, 17b substantially in the position of rest (as shown in ghost).

As the module 11 is retracted into orbiter fuselage, it will be visualized that there occurs a change in the position of the center of gravity of the orbiter. Since such change may adversely affect the flight characteristics of the orbiter, provision is made to readily move the module once it is retracted. This is accomplished in the form of the aforementioned positioning means 51 which comprise tracks, rails or other means for movably supporting the module after it is disposed in the fuselage.

In operation of the space vehicle system described herein, the aerodynamic stability is maintained by selective pivotal movement of engine module 11 about its pivot 15. Stability requires that the thrust vector of the module be directed through the center of gravity (CG) of the system 1 (see FIG. 1). It will be recognized that the fuel in tanks 7 and 9 will be progressively diminished after the system 1 is launched and that therefore the CG of the system will be changing. Thus the engine module is programmed to selectively, angularly move with respect to the horizontal axis "A" of the system.

With reference to FIG. 1, it may be visualized that the center of gravity of system 1 might, for example at launch, reside at point CG-1. At some time thereafter, as the fuel in the hydrogen and liquid oxygen tanks 7, 9 is being consumed, the center of gravity may move approximately to point CG-2; and concomitantly the pivoted module 11 is programmed to angularly move so that the thrust vector targets the point CG-2; and continually targets the center of gravity as it moves to CG-3. At this predetermined center of gravity point the engine module has pivoted to a predetermined position coinciding with the time at which the propellant in tank 5 has been exhausted. At such time, module 11 is uncoupled from the expendable tank 5 and retraction is initiated. Likewise, the uncoupling mechanisms (not shown) between tank 5 and orbiter 3 are actuated so that the tank is expended from the orbiter vehicle.

The present invention makes the external expendable propellant tank concept more operationally attractive because there is disclosed a structure in which a single engine module 11 may be mounted from the orbiter vehicle 3 and operatively connected to tank 5 substantially along the axis thereof so as to reduce the module pivoting angles normally necessary to maintain targeting of the thrust vector through the CG of the system. Increased stability and reliability is thereby designed into the system. In addition, it is apparent that the provision for a retractable engine module not only enables retrieval and preservation of the engine for subsequent use but eliminates the necessity for disturbing the surface integrity of orbiter 3 by the intrusion of fuel lines and other such interface connections. It should be further recognized that improved stability accrues not only to the system 1 by reason of the externally disposed propellant tank having its engine module axially aligned therewith, but also improved stability accrues to the orbiter vehicle itself after the propellant tank is jettisoned. This is due to the track, rails, or other positioning means 51 disposed within the fuselage and which enables movement of the module 11 therewithin in order to achieve optimal positioning of the orbiter CG after separation from the tank. External positioning of the propellant tank also clearly increases the payload area 31 of the orbiter thereby enabling more versatile use of the orbiter than what otherwise would be possible.

Although the invention herein has been described in several preferred embodiments which demonstrate varying support and retraction arrangements for an engine module deployed externally and beneath the orbiter vehicle and in operative connection to an external, expendable propellant tank, it should be recognized that these are only exemplary designs and that there are numerous other modifications, substitutions and changes which may be made to the space vehicle system 1 without departing from the spirit hereof, so long as such modifications, substitutions and changes are within the scope of the claims appended hereto.

Therefore, that which is claimed and desired to be secured by United States Letters Patent is:

1. A space vehicle system consisting of an orbiter vehicle having an externally mounted propellant tank that is expendably affixed to a side thereof; the improvement comprising:
   an engine module disposed proximate the aft end of the propellant tank and releasably communicating therewith so as to obviate the need for fuel lines into the orbiter vehicle fuselage, and
   support and retraction means coupling the engine module to the orbiter vehicle so that the module may, subsequent to expenditure of the empty propellant tank, be retracted into the orbiter vehicle.

2. The space vehicle system of claim 1 wherein the propellant tank includes axially aligned discrete forward and aft compartments containing first and second fuel components of differing weight, the heavier of said components being disposed in the aft compartment adjacent to said engine module in order that the structural design of the expendable tank may be reduced due to the transmission of engine thrust forces directly to the area of principal mass, thereby providing for design having lighter structural weight.

3. The space vehicle system of claim 1 wherein said engine module is mounted for angularly adjustable movement during the operation thereof so as to direct the thrust vector through the center of gravity of the system,
   said propellant tank being disposed in substantial axial alignment with said engine module so that the angular movement of the module may be minimized during launch procedure.

4. The space vehicle system of claim 2 wherein said engine module is movably mounted during operation so as to variably direct its thrust vector through the changing center of gravity of the system,
   said propellant tank being disposed in substantial axial alignment with said engine module so that angular movement of the module may be minimized during launch procedure.

5. The space vehicle system of claim 1 wherein said support and retraction means for the engine module are adapted to move the module upwardly and inwardly through an opening in the aft end of the orbiter.

6. The space vehicle system of claim 1 wherein said retraction means for the engine module is adapted to move the module upwardly and into the orbiter fuselage through an opening in the upper side thereof.

7. The space vehicle system of claim 1 wherein said support and retraction means comprises a plurality of articulated link means pivotally connected to one another and adapted to move said engine module through a predetermined path of sequential positions from its operative to its stowed position in the orbiter.

8. The space vehicle system of claim 7 wherein said articulated link means are adapted to move the engine module upwardly and inwardly through an opening in the aft end of the orbiter fuselage.

9. The space vehicle system of claim 8 wherein the engine module has a thrust axis and the angle thereof is maintained substantially constant throughout the path of movement.

10. The space vehicle system of claim 7 wherein said articulated link means are adapted to move the engine module upwardly and inwardly through an opening in the upper side of the orbiter fuselage.

11. The space vehicle system of claim 10 wherein the engine module has a thrust axis and the angle thereof is maintained substantially constant throughout the path of movement.

12. A method for increasing the payload area of a space vehicle system while simultaneously reducing the system weight and increasing the range and maneuverability for landing subsequent to re-entry, comprising the steps of;
   providing a payload vehicle having its engine module disposed exteriorly of the fuselage, the fuselage being characterized by an aft opening therein,
releasably affixing to the exterior of the fuselage, in operative relation to the engine module, a propellant tank having fuel therein,
launching the vehicle system by actuating the engine module until the fuel in the tank is consumed,
retracting the propulsion engine module into the opening in the fuselage and,
expending the propellant tank from the vehicle.

13. The method of launching a space vehicle system essentially comprising a space vehicle carrying an external engine module at the aft end of the fuselage thereof and an expendable propellant tank also externally mounted to the fuselage in operative communicating relation to the engine module so as to reduce the weight of the vehicle by jettisoning the tank when the propellant is exhausted, comprising the steps of:
   igniting said engine module so as to propel the system along a predetermined path of flight,
   utilizing substantially all of the fuel in said tank prior to the expenditure thereof from the space vehicle,
   terminating operation of the engine module,
   retracting the engine module away from the propellant tank and into more proximate relation to the fuselage, and
   separating and expending the tank from the space vehicle so as to thereby reduce the dry weight and also improve navigability.

14. The space vehicle system of claim 13 wherein the propellant tank is characterized by compartmentalized forward and aft sections extending along the longitudinal axis thereof for containing each a relatively light and a relatively heavy propellant component, and including the additional step of:
   disposing the heavier of the fuel components in the aft section of the tank so that the engine module transmits thrust forces directly to the structure enclosing the greater weight, thereby enabling reduced structural weight in tank.

15. The space vehicle system of claim 14 including the additional step of improving system reliability by disposing the retractable engine module in axial alignment with the lontitudinal axis of the propellant tank, thereby minimizing pivoting movement of the module during the firing period thereof and eliminating fuel line interfaces in the space vehicle fuselage.

16. The space vehicle system of claim 15 wherein the step of retracting the engine module is characterized by the movement thereof into the fuselage through an opening in the aft end thereof.

17. The space vehicle system of claim 15 wherein the fuel propellant tank is disposed adjacent the under side of the vehicle and the step of retracting the engine module is characterized by the movement thereof into the fuselage through an opening in the upper ventral side of the fuselage thereof.

18. The space vehicle system of claim 13 including the further step of retracting the module into the vehicle and adjusting its position thereafter in order to optimize the center of gravity of the vehicle for desirable flight characteristics.

* * * * *